United States Patent [19]
Loeser et al.

[11] 3,944,964
[45] Mar. 16, 1976

[54] AIR DROPPED LINEAR ACOUSTIC DETECTOR

[75] Inventors: Harrison T. Loeser, Waterford; Hamlin A. Caldwell, Jr., Stonington, both of Conn.

[73] Assignee: The United States of America as represented by the Secretary of the Navy, Washington, D.C.

[22] Filed: Dec. 19, 1973

[21] Appl. No.: 427,762

[52] U.S. Cl. .................................... 340/2; 340/6 R
[51] Int. Cl.[2] ...................... G01S 3/80; B63C 49/00
[58] Field of Search ............. 340/2, 3 T, 7 R, 7 PC, 340/8 R, 8 S, 9, 6 R

[56] References Cited

UNITED STATES PATENTS

| | | | |
|---|---|---|---|
| 3,290,642 | 12/1966 | Mason et al. | 340/2 |
| 3,660,809 | 5/1972 | Pearson | 340/8 S |
| 3,800,271 | 3/1974 | Stillman, Jr. | 340/2 |

*Primary Examiner*—Richard A. Farley
*Attorney, Agent, or Firm*—Richard S. Sciascia; Arthur A. McGill; Prithvi C. Lall

[57] ABSTRACT

A self-deploying and a self-aligning linear acoustic detector which can be air dropped. The detector includes a parachute for deployment and has a mast, set of sails and booms for deploying and aligning an array of the detector. A neutrally buoyant array cable includes a plurality of neutrally buoyant hydrophones attached along its length which can be deployed horizontally at a predetermined depth in water. The array is also provided with a drogue at one end thereof to facilitate deployment of the array and to prevent it from moving after its deployment. The array is also provided with an auxiliary buoy for establishing the operating depth of the drogue and of the array. Ballast weights are provided to keep the mast vertical and to carry the array cable to a predetermined depth and keep it in a horizontal position after its deployment.

9 Claims, 4 Drawing Figures

AIR DROPPED LINEAR ACOUSTIC DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to linear arrays and more specifically to an air droppable, self-deploying and self-aligning linear acoustic detector for providing advanced listening capability based on the ability of the detector to listen in selected acoustic beams.

There exist several types of air dropped acoustic listening devices, commonly known as sonobuoys. They may be deployed in groups for localization of targets. Besides, line arrays have been towed from vessels and implanted in the ocean. The air dropped devices have many advantages such as quick reaction to a threat, rapid deployment over large distances and elimination of a waterborne platform. The line arrays have advantages because of their ability to listen in certain selected narrow beams, thus greatly improving the signal to noise ratio and achieving long ranges and improved discrimination. It is thus desirable to combine the advantages of air dropped acoustic listening devices such as sonobuoys and those of line arrays.

SUMMARY OF THE INVENTION

The objects and advantages of the present invention are accomplished by utilizing a linear acoustic detector which can be air dropped and which self-deploys and self-aligns. The detector comprises a parachute or rotochute system. A mast, a set of booms and sails, and a ballast weight, are all stowed together in a buoyant main body of the linear acoustic detector. The main body or electronic buoy is attached to the parachute by means of a line. The main body of the detector also houses a transmitter, a power source and allied electronics. The main body is attached to a cable pod which stows a plurality of hydrophones, a weighted section or array ballast, a compass and an array cable. The cable pod is also attached to a buoyant auxiliary buoy by means of a light line or cable. Various components of the detector such as the parachute, the main body, the cable pod, and the auxiliary buoy, are tied together by means of lines and cables. In operation, when the detector is air dropped, the parachute section opens up and slows the downward motion of the detector. The main body plunges into the water together with the auxiliary buoy and the cable pod and the parachute portion of the detector is disengaged. The buoyant main body then comes to the water surface and the mast, the booms and the sails open up from the stowed position in the main body. However, the cable pod and the auxiliary buoy continue their journey in water and sink to a predetermined depth controlled by the length of the line between the main body and the array ballast, after which the buoyant auxiliary buoy rises to the water surface. The drogue portion of the cable pod then opens up and serves to hold one end of the array cable in position. In the meantime, the sails propel the main body down wind under the influence of wind and/or surface current and the contents of the cable pod including the array cable, the set of hydrophones and signal conditioners, and the array ballast are hauled out. The array ballast attached to the other end of the array cable positions the hydrophones of the array at a predetermined depth in a horizontal plane.

An object of this invention is to provide a self-deployable and self-aligning linear acoustic detector.

Another object of this invention is to provide an air dropped linear acoustic detector which provides a long range and an improved discrimination against noise.

Still another object of this invention is to provide an air dropped linear acoustic detector which combines the advantages of sonobuoys and line arrays.

Still another object of this invention is to provide a system which has a quick response for deployment.

Other objects, advantages and novel features of the invention will become apparent from the following detailed description of the invention when considered in conjunction with the accompanying drawings wherein:

DESCRIPTION OF A PREFERRED EMBODIMENT

Figure 1:
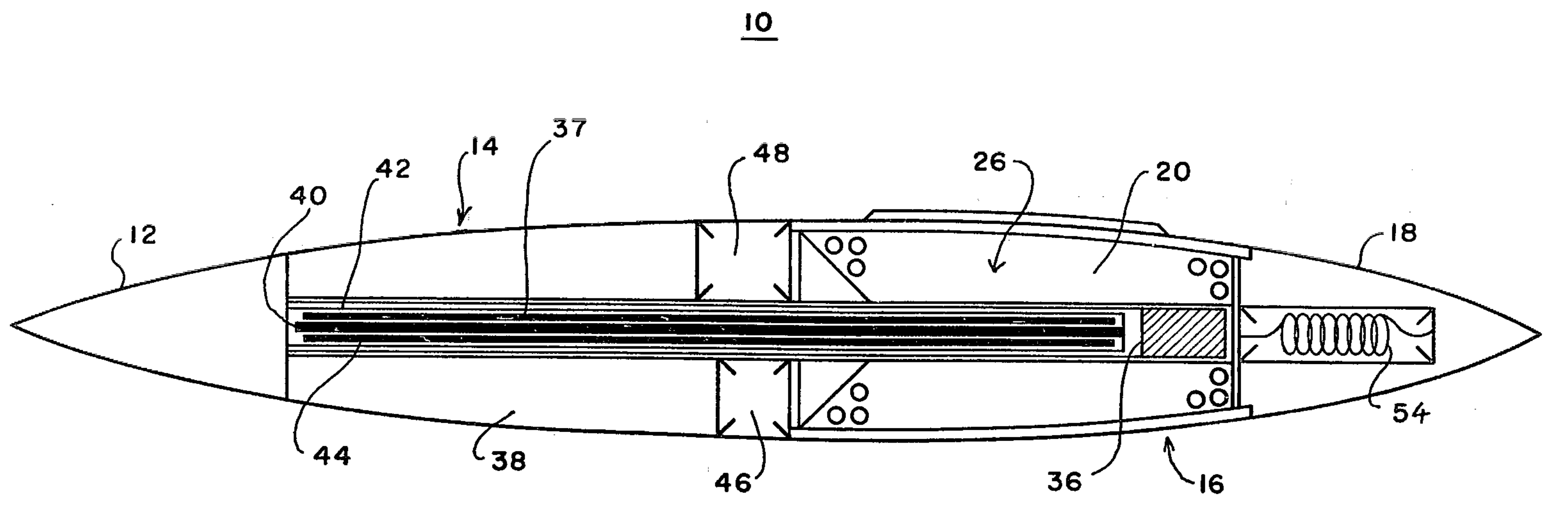
FIG. 1 is a diagrammatic representation of an air dropped linear acoustic detector.

Referring to the drawings wherein like reference characters designate like parts throughout and more particularly to FIG. 1 thereof, a perspective view of the linear acoustic detector is shown. Numeral 10 shows the detector comprising four sections: a parachute or rotochute 12; main body or electronics buoy 14; cable pod/drogue 16; and an auxiliary buoy 18, all tied together to form a single unit.

Figure 2:
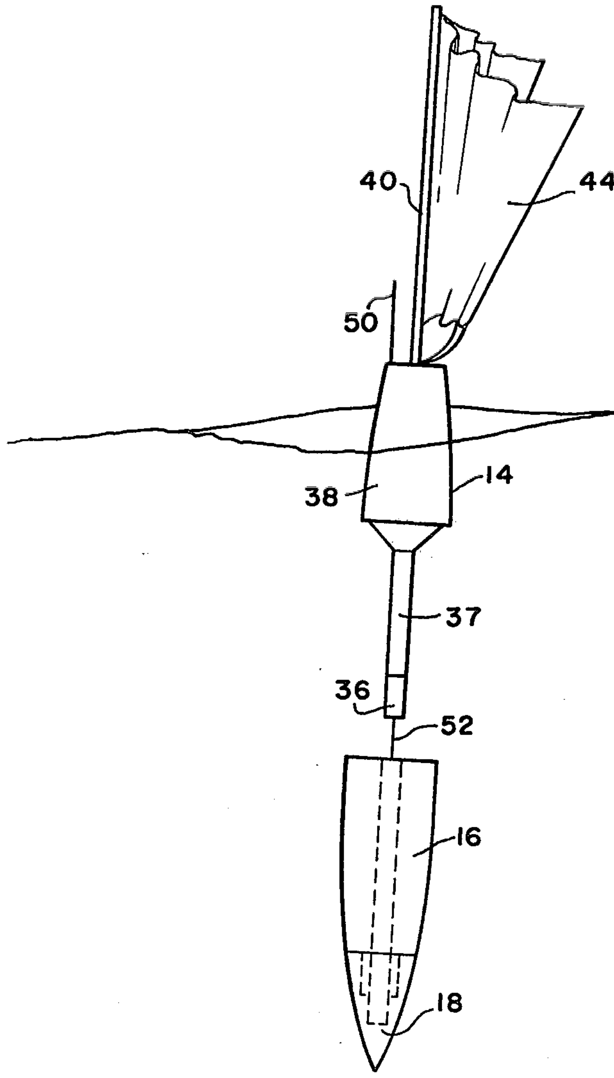
FIG. 2 shows a position of the linear acoustic detector after it has been dropped.
Figure 3:
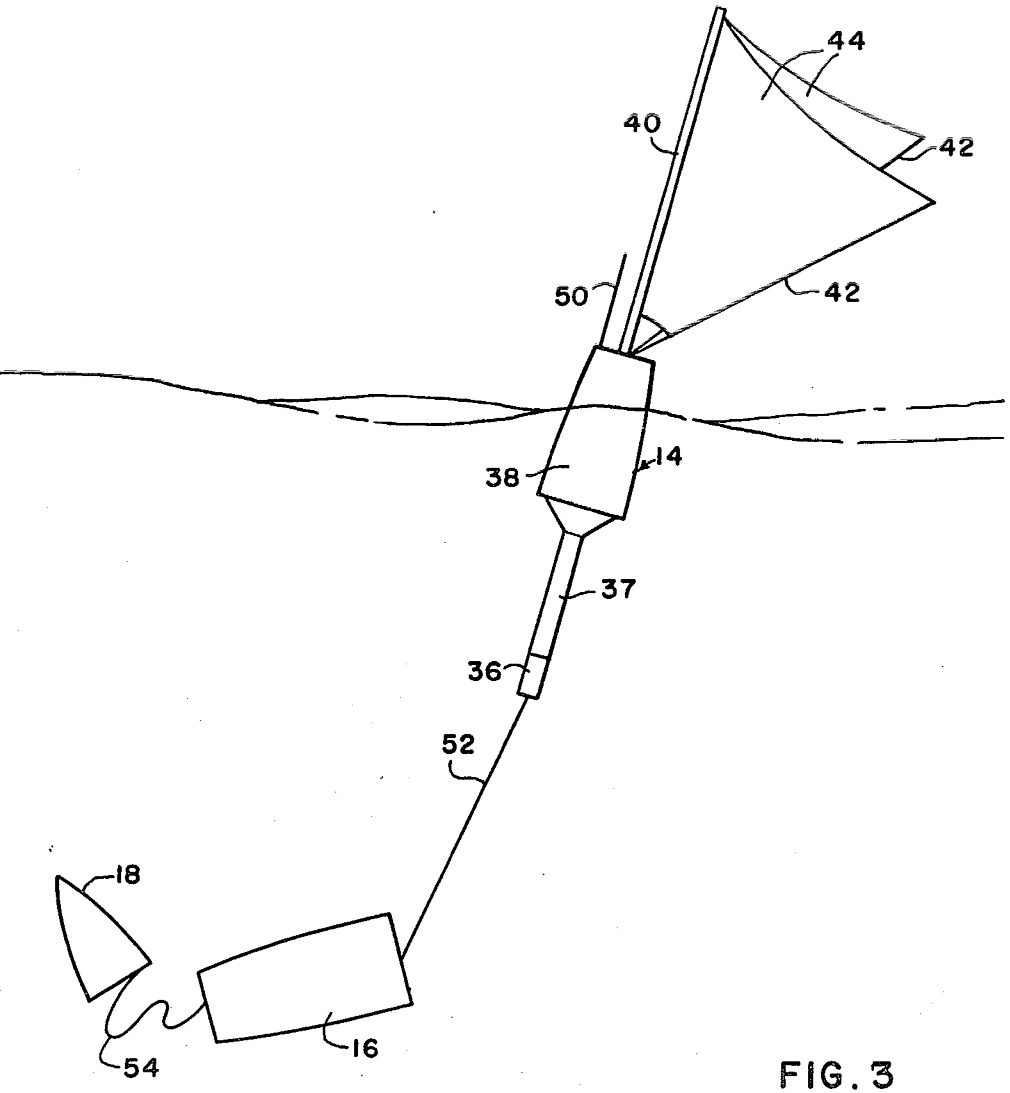
FIG. 3 shows a position of the linear acoustic detector subsequent to the position shown in FIG. 2.
Figure 4:
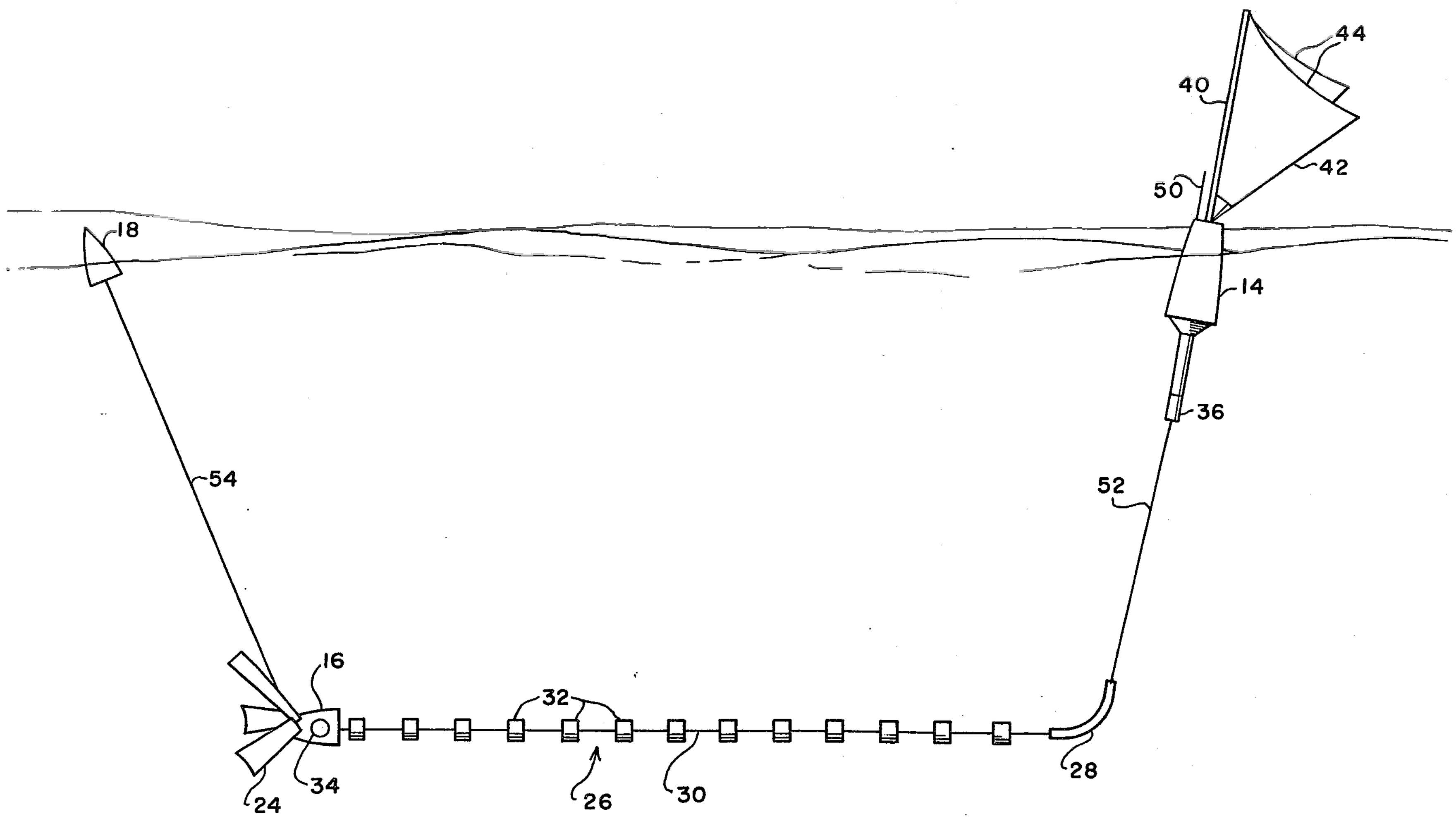
FIG. 4 shows the configuration of the linear acoustic detector after it has been deployed.

Cable pod 16 comprises a cable tub 20 and a drogue 24. It contains the array 26 which includes a weighted section or array ballast 28, and a neutrally buoyant array cable 30, neutrally buoyant set 32 of hydrophones and signal conditioners, and a compass 34. The main body or electronics buoy comprises a ballast weight or a weighted section 36, and a hollow cylindrical section 37 for stowing the mast 40, a set 42 of booms, and a set 44 of sails and a buoyant section 38. Within the main body there is located a battery 46 and a transmitter 48. An antenna 50 is also shown in FIGS. 2 and 3 for transmitting signals from the hydrophone set 32 via transmitter 48. Compass 34 is used for sensing the direction of the array. Various sections of the detector, i.e., parachute 12, main body 14, cable pod 16, and auxiliary buoy 18, are held together as a single unit by various lines or cables. In a closed position of the detector, the set of booms and the set of sails are stowed in the hollow cylindrical section 37 of the main body 14. Parachute 12 and main body 14 are connected to each other by means of a line which is also used for deployment purposes. A line 54 connecting the auxiliary buoy 18 to cable pod 20 is also shown in FIG. 1. In the closed position of the array, the array cable 30, the drogue 24, the set 32 of hydrophones including signal conditioners, the compass 34, and the array ballast weight 28 are stowed in cable pod 16. It is to be noted that the shapes of the various sections of this line array can vary without deviating from the teachings of this invention. Furthermore, the materials of which these sections are made may also vary.

The deployment of the array is accomplished by dropping it from an airplane or other vehicle which may carry the unit within a cargo space, a bomb bay on a wing rack, or a stowage container. When the unit is released, the parachute or decelerator deploys to slow down the unit to an acceptable drop speed. When the unit enters the water, several actions are initiated. The mast-booms-sails combination is extended and the auxiliary buoy 18 and the cable pod 16 are released from the main body 14. The weight of the array ballast 28 in the cable pod causes both the auxiliary buoy 18 and the cable pod 16 to descend as shown in FIGS. 2 and 3.

FIG. 2 represents the position where the sails and the booms are partially extended and the cable pod and the auxiliary buoy are in the initial stages of their journey downward into the water. It is to be noted that as soon as the sails and booms open up, the parachute portion of the linear acoustic detector is disengaged from the remaining sections of the linear acoustic detector.

FIG. 3 represents the position of the cable pod 16, auxiliary buoy 18 and the main body 14 after elapsing of some time from the situation shown in FIG. 2.

The buoyancy of the auxiliary buoy 18 causes it to return to the surface while the cable pod continues downward until it is stopped by the disengagement of the array ballast weight 28 which are now supported by the main body or electronics buoy 14. The array cable 30 and set 32 of hydrophones and signal conditioners are neutrally buoyant. Therefore, the auxiliary buoy 18 need only support the in-water weight of the cable pod 16 which is small. At this time, a release is triggered which extends the drogue 24. It should be noted that the deployment of the array depends on the existence of either a wind which will blow the main body 14 down wind from the cable tub/drogue 20 or a surface current which will accomplish the same effect. It is possible that the array might move under the influence of both a wind and a surface current. The movement of the main body 14 away from the cable tub/drogue 20 hauls the array from the tub 20 and causes it to form a linear configuration when it has all been hauled out. The force of the wind and/or current on the main body will keep the array 30 taut as it slowly moves down wind and/or down current. The array ballast 28 keeps the array at a depth determined by the riser line of the array, i.e., the length of line 52. The contents of the cable pod 16 including the array ballast 28, the compass 34, the array cable 30 and the hydrophones set 32, start coming out of the cable pod 16 until the array cable 30 takes on the position of a line. The ballast weight 36 keeps the mast in vertical position, the array cable stays in a horizontal plane, the position of which is determined by the length of the riser line 52 between the main body and the array ballast 28 which is the same as the length of the line 54 between the cable pod and the auxiliary buoy.

Briefly stated, the linear acoustic detector of this invention comprises a parachute, main body, cable pod, an array in the cable pod, and an auxiliary buoy, all connected together to form a single unit. The cable array, including a plurality of hydrophones, signal conditioners and a compass, are stowed in the cable pod. A mast-booms-sails arrangement is stowed in the main body before the detector is activated by dropping it near the area of interest. when the detector is dropped, the parachute slows down the speed of the unit to an acceptable drop speed. When the unit reaches the water, the parachute is disengaged from the remaining sections of the detector and the mast-booms-sails combination is extended with the release of the auxiliary buoy and the cable pod. The cable pod and auxiliary buoy travel through the water due to the weight of the array ballast in the cable pod up to a depth determined by the length of the line between main body and the array ballast. At that position the buoyant auxiliary buoy starts going up until it reaches the surface. In the meantime, the mast-booms-sails combination moves down wind under the influence of a wind or current which causes the contents of the cable pod, i.e., the array cable including the hydrophones, compass and the signal conditioners, and the array ballast, to be hauled out and the drogue to open up. The ballast weight attached to the main body keeps the mast in the upright position. It is to be noted that existing types of hydrophones and signal conditioners, power sources such as batteries, transmitters and allied electronics may be used to practice the teachings of this invention.

Obviously many modifications and variations of the present invention are possible in the light of the above teachings. As an example, the shape of the array unit may vary from a streamlined configuration to any other suitable configuration. Furthermore, different types of mast-sail arrangements may be used including the use of gas filled shapes either affixed to the buoy or airborne and different methods of stowing them. Furthermore, shape and design of the drogue used may also vary. Besides, methods of stowing the array in the cable tub may also vary. Furthermore, the antenna for the transmitter may be installed in the mast-booms-sails arrangement. It is therefore understood that within the scope of the appended claims the invention may be practiced otherwise than as specifically described.

We claim:

1. A linear acoustic detector comprising:
- a parachute section;
- a main body detachatably connected to said parachute section;
- a mast-booms-sails arrangement removably stowed in said main body;
- a cable pod connected to said main body;
- an array cable removably stowed away in said cable pod;
- a plurality of hydrophones connected along the length of said array cable; and
- an auxiliary buoy detachably connected to said cable pod.

2. The linear acoustic detector of claim 1 wherein said main body further includes a ballast weight adapted to keep the mast of said mast-booms-sails combination generally vertical when in the open position thereof.

3. The linear acoustic detector of claim 2 wherein said main body includes a transmitter and a source of power housed therein.

4. The linear acoustic detector of claim 3 wherein said cable pod further includes a compass fixed therein for sensing said array cable direction in the deployed position thereof.

5. The linear acoustic detector of claim 4 wherein said plurality of hydrophones and said array cable are neutrally buoyant.

6. The linear acoustic detector of claim 5 wherein said cable pod further includes an array ballast weight detachably housed therein for maintaining said array cable in generally horizonal plane in the deployed position thereof.

7. The linear acoustic detector of claim 6 wherein said cable pod further includes a drogue secured at one end thereof for reducing the movement of said cable array in the deployed position thereof.

8. The linear acoustic detector of claim 7 wherein said main body is buoyant.

9. The linear acoustic detector of claim 8 wherein said auxiliary buoy is buoyant.

* * * * *